US010649565B2

(12) United States Patent
Lee et al.

(10) Patent No.: US 10,649,565 B2
(45) Date of Patent: May 12, 2020

(54) TOUCH DISPLAY DEVICE AND TOUCH DISPLAY PANEL HAVING A BEND AREA INCLUDING A DIELECTRIC LAYER WITH A COMPENSATION PATTERN

(71) Applicant: LG DISPLAY CO., LTD., Seoul (KR)

(72) Inventors: Yangsik Lee, Paju-si (KR); JiHyun Jung, Paju-si (KR); DeukSu Lee, Paju-si (KR); JaeGyun Lee, Paju-si (KR); Ruda Rhe, Paju-si (KR); Jeonghoon Lee, Paju-si (KR); Su Chang An, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/807,288

(22) Filed: Nov. 8, 2017

(65) Prior Publication Data
US 2018/0348930 A1    Dec. 6, 2018

(30) Foreign Application Priority Data

Jun. 1, 2017  (KR) .......................... 10-2017-0068257

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G06F 3/044* (2013.01);
(Continued)

(58) Field of Classification Search
CPC .............. G09G 2380/02; G06F 1/1652; G06F 2203/04102; G06F 3/0412; G06F 3/0416;
(Continued)

(56) References Cited

U.S. PATENT DOCUMENTS

2014/0042406 A1*  2/2014  Degner ................. H01L 27/326
257/40
2014/0055702 A1*  2/2014  Park ................... G02F 1/136286
349/43
(Continued)

FOREIGN PATENT DOCUMENTS

JP         4-331921 A      11/1992
JP        2013-47937 A      3/2013
(Continued)

*Primary Examiner* — Adam J Snyder
(74) *Attorney, Agent, or Firm* — Seed Intellectual Property Law Group LLP

(57) ABSTRACT

A touch display device and a touch display panel are provided. The touch display panel includes a bend area adjacent to the periphery of the touch display panel, and touch lines disposed in the bend area have zigzag shapes that extend at angles with respect to a bend axis about which the bend area is bent. A first dielectric layer includes a compensation pattern that is located in the bend area and includes an opening that extends in a direction parallel to the bend axis. A second dielectric layer protrudes into the opening of the compensation pattern in a depth direction. During bending of the bend area, this configuration disperses force applied to portions of the touch lines and the dielectric layers in the bend area. This can consequently prevent both cracking due to bending and moisture permeation due to cracks.

20 Claims, 11 Drawing Sheets

(51) Int. Cl.
*G02F 1/1333* (2006.01)
*G06F 3/047* (2006.01)
*H01L 51/52* (2006.01)

(52) U.S. Cl.
CPC ............ G06F 3/047 (2013.01); G06F 3/0416 (2013.01); H01L 51/5203 (2013.01); *G06F 2203/04102* (2013.01)

(58) Field of Classification Search
CPC ...... G06F 3/044; G06F 3/047; G02F 1/13338; H01L 51/5203
USPC ........................................................ 345/173
See application file for complete search history.

(56) References Cited

U.S. PATENT DOCUMENTS

| | | | | |
|---|---|---|---|---|
| 2014/0217373 A1* | 8/2014 | Youn | ................... | H01L 23/4985 257/40 |
| 2014/0232956 A1* | 8/2014 | Kwon | ............... | G02F 1/133305 349/12 |
| 2015/0382446 A1* | 12/2015 | Kwon | ................... | H05K 1/028 174/251 |
| 2016/0035759 A1* | 2/2016 | Kwon | ................ | H01L 27/1244 257/40 |
| 2016/0103534 A1* | 4/2016 | Zhang | .................... | G06F 1/169 345/173 |
| 2016/0105950 A1* | 4/2016 | Drzaic | .................. | B05D 3/002 174/251 |
| 2016/0174304 A1 | 6/2016 | Kim et al. | | |
| 2016/0218305 A1 | 7/2016 | Kim et al. | | |
| 2016/0239133 A1 | 8/2016 | Ko et al. | | |
| 2016/0306462 A1* | 10/2016 | Park | ....................... | G06F 3/044 |
| 2016/0320876 A1* | 11/2016 | Son | ....................... | G06F 3/044 |
| 2017/0031389 A1 | 2/2017 | Yoo et al. | | |
| 2017/0062760 A1* | 3/2017 | Kim | .................... | H01L 51/5253 |
| 2017/0110529 A1* | 4/2017 | Zhang | ................ | H01L 27/3276 |
| 2017/0294495 A1* | 10/2017 | Shyu | ....................... | G06F 3/041 |

FOREIGN PATENT DOCUMENTS

| | | |
|---|---|---|
| JP | 2016-99999 A | 5/2016 |
| JP | 2016-192005 A | 11/2016 |
| TW | 201248801 A1 | 12/2012 |
| WO | 2015/174126 A1 | 11/2015 |

* cited by examiner

TOUCH DISPLAY DEVICE AND TOUCH DISPLAY PANEL HAVING A BEND AREA INCLUDING A DIELECTRIC LAYER WITH A COMPENSATION PATTERN

CROSS REFERENCE TO RELATED APPLICATION

This application claims priority from Korean Patent Application No. 10-2017-0068257, filed Jun. 1, 2017, which is hereby incorporated by reference for all purposes as if fully set forth herein.

BACKGROUND

Technical Field

The present disclosure relates to touch display devices, and touch display panels. More particularly, the present disclosure relates to touch display devices and touch display panels having a bent or bendable area.

Description of the Related Art

In response to the development of the information society, there has been increasing demand for various types of display devices able to display images. Recently, a range of display devices, such as liquid crystal display (LCD) devices, plasma display panels (PDPs), and organic light-emitting display devices, have come into widespread use.

Such display devices may provide a touch-based input interface, which may be capable of recognizing a user's touch on a display panel and performing input processing, based on the recognized touch, to provide a wider range of functions to users.

As an example, a plurality of touch electrodes to detect a user's touch on a display panel and touch lines to connect the touch electrodes to a driving circuit are disposed on the display panel. Accordingly, the user's touching state, positions of the touch on the display panel, or the like, may be detected by sensing a change in capacitance that occurs during the user's touch on the display panel.

However, although there is a need to dispose the touch electrodes and touch lines on the conventional display panel, it is difficult to implement the touch electrodes and touch lines due to an inherent structure of the display panel.

BRIEF SUMMARY

Various aspects of the present disclosure provide a touch display device and a touch display panel, in which touch electrodes and touch lines are disposed to recognize a user's touch on a display panel, and a fabrication method thereof.

Also provided is a touch display device and a touch display panel, in which touch lines disposed on a bend area adjacent to a periphery of a touch display panel are prevented from being cracked, and a fabrication method thereof.

According to an embodiment of the present disclosure, a touch display device is provided that includes a flexible substrate, a touch display panel on the flexible substrate, the touch display panel including a plurality of touch electrodes and having a bend area adjacent to at least a portion of a periphery of the touch display panel. A plurality of touch lines are disposed on the touch display panel and extend into the bend area. A first dielectric layer is disposed on the plurality of touch lines and includes an opening that forms at least a part of a compensation pattern in the bend area. A second dielectric layer is disposed on the first dielectric layer and in the opening in the compensation pattern of the first dielectric layer.

In another embodiment, the present disclosure provides a touch display panel that includes an encapsulation layer, a plurality of touch lines on the encapsulation layer, a first dielectric layer on the plurality of touch lines, and a second dielectric layer on the first dielectric layer. The first dielectric layer includes a compensation pattern having an opening in a bend area positioned adjacent to a periphery of the touch display panel.

In a yet another embodiment, the present disclosure provides a device that includes a flexible substrate having an active area, a bend area, and a link area between the active area and the bend area. A touch layer is provided on the flexible substrate, and the touch layer includes a plurality of touch electrodes. Each of the plurality of touch electrodes includes a first portion in the link area, a second portion in the bend area, and a third portion in the bend area. The second portion and the third portion are connected to the first portion, and at least one of the plurality of touch electrodes includes the second and third portions in the link area. A first dielectric layer is provided on the touch layer in the bend area, and the first dielectric layer includes an opening.

According to the various embodiments provided by the present disclosure, a touch display device, and a touch display panel provide a structure in which the touch lines are disposed in the peripheral bend area of the display panel, thereby preventing the touch lines from being cracked in the peripheral bend area.

Further, the present disclosure provides various structures in which the dielectric layer disposed on the touch lines in the peripheral bend area includes the open compensation pattern, thereby preventing both cracking due to the bending of the bend area and moisture permeation due to cracks.

BRIEF DESCRIPTION OF THE SEVERAL VIEWS OF THE DRAWINGS

The above and other objects, features and advantages of the present disclosure will be more clearly understood from the following detailed description when taken in conjunction with the accompanying drawings, in which.

DETAILED DESCRIPTION

Figure 1:
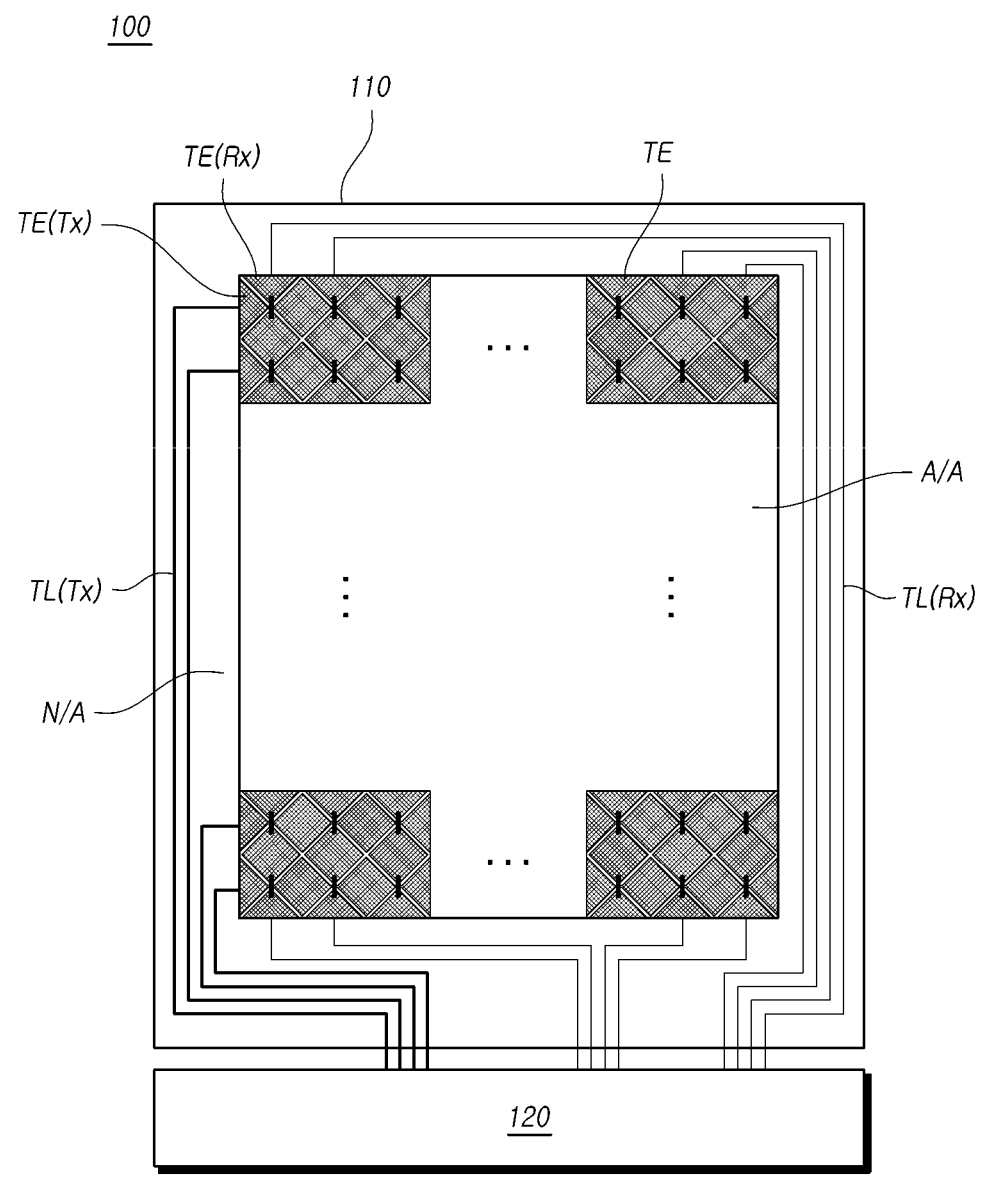
FIG. 1 is a plan view schematically illustrating a touch display device according to one or more embodiments of the present disclosure.

Hereinafter, reference will be made to various embodiments in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein may be omitted in the case that the subject matter of the present disclosure may be rendered unclear thereby.

It will also be understood that, while terms such as "first," "second," "A," "B," "(a)," and "(b)" may be used herein to describe various elements, such terms are merely used to distinguish one element from another element. The substance, sequence, order, or number of these elements is not limited by these terms. It will be understood that when an element is referred to as being "connected to" or "coupled to" another element, not only can it be "directly connected or coupled to" the other element, but it can also be "indirectly connected or coupled to" the other element via one or more "intervening" elements. In the same context, it will be understood that when an element is referred to as being formed "on" or "under" another element, not only can it be directly formed on or under another element, but it can also be indirectly formed on or under another element via one or more intervening elements.

FIG. 1 is a plan view schematically illustrating a touch display device 100 according to one or more embodiments of the present disclosure.

Referring to FIG. 1, the touch display device 100 includes: a touch display panel 110 on which a plurality of touch electrodes TE and a plurality of touch lines TL are disposed; and a driving circuit 120 that outputs a touch driving signal to the touch electrodes TE and receives a touch sensing signal from the touch electrodes TE so as to sense a user's touch based on the touch sensing signal.

The touch display panel 110 may have an active area A/A in which a plurality of sub pixels are disposed to display images, and a non-active area N/A that is located outside of the active area A/A and in which signal lines to transmit signals to the sub pixels, and the like, are disposed.

In the active area A/A of the touch display panel 110, gate lines and data lines are disposed, intersecting each other, and the sub pixels are disposed in intersection regions between the gate lines and data lines.

The sub pixels disposed in the active area A/A serve to display images through the active area A/A by displaying gradation in response to data voltages supplied via data lines at the timing of a scanning signal applied to the gate line.

In such an active area A/A, in addition to the configurations for driving the display, the plurality of touch electrodes TE for sensing a user's touch may be disposed. That is, the touch electrodes TE for sensing touch may be provided in the active area A/A, in addition to the plurality of sub pixels,
the gate lines and the data lines that are provided in the active area A/A for displaying images.

The touch display device 100 may be any type of display device, including, for example, a liquid crystal display (LCD) device and an organic light emitting display device. When the touch display device 100 is an LCD device, a common electrode disposed on the active area may be used as the touch electrodes TE. When the touch display device 100 is an organic light-emitting display (OLED) device, the touch electrodes TE may be disposed on an encapsulation layer, but the present disclosure is not limited thereto.

Figure 2:
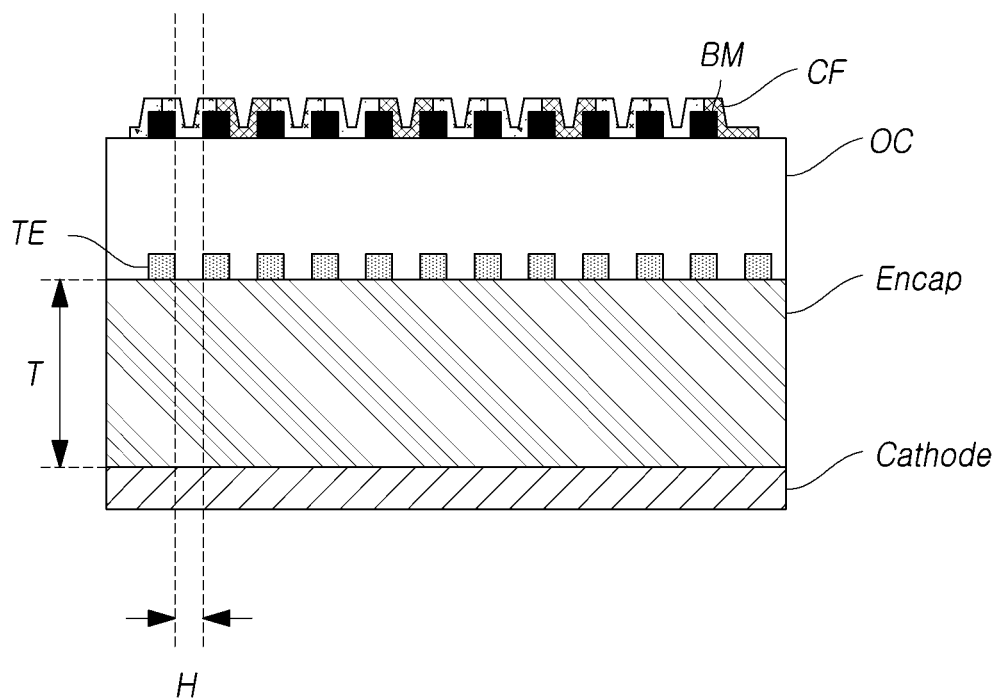
FIGS. 2 and 3 are cross-sectional views of a touch display device according to one or more embodiments of the present disclosure.
Figure 3:
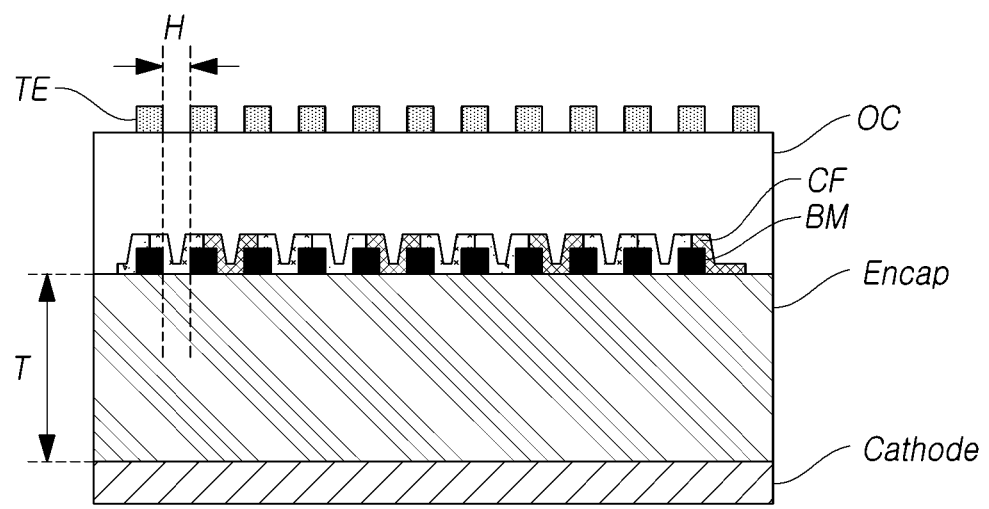

Briefly describing a layout structure of the touch electrodes TE with reference to FIGS. 2 and 3 when the touch display device 100 is an OLED device, the touch electrodes TE may be disposed between the encapsulation layer Encap and a cover of the display panel 110, as shown in FIG. 2.

That is, the touch-sensing configuration such as the touch electrodes TE and the touch lines TL (not shown) may be disposed on the encapsulation layer Encap.

Specifically, a cathode of an organic light-emitting diode (OLED) and the touch electrodes TE are disposed opposite to each other below and above the encapsulation layer Encap.

The thickness (T) of the encapsulation layer Encap may be, for example, 5 μm or more.

With the design of the encapsulation layer Encap having a certain thickness or more, parasitic capacitance between the cathode of the OLED and the touch electrodes TE can be reduced to a suitable level. This can thus suppress or prevent a reduction in touch sensing sensitivity due to parasitic capacitance.

In one or more embodiments, the touch electrodes TE may be of a mesh type structure having holes H between adjacent touch electrodes TE, and the holes H may be disposed in positions corresponding to light-emitting parts of the sub pixels. The holes H may be aligned with the light-emitting portions of the sub pixels, such that light emitted from the sub pixels may pass through the holes H, between adjacent touch electrodes TE, and out of the display device to display an image.

Thus, the holes H of the touch electrodes TE may correspond to color filters CF. When such color filters CF are utilized, such as in the case of using white OLEDs, the color filters CF and the holes H of the touch electrodes TE may be provided in corresponding positions to provide a touch display device 100 having excellent light emitting performance. That is, the color filters CF may be aligned with the holes H so that light emitted from a respective sub pixel may pass through a respective hole H and through a respective color filter CF. The color filters CF may have various colors and may correspond, for example to red, green and blue sub pixels.

Vertical locations of the touch electrodes TE and the color filters CF may be designed in a variety of manners. That the touch electrodes TE and the color filters CF may have various positions with respect to each other in various designs.

For example, as illustrated in FIG. 2, the color filters CF and a black matrix BM may be disposed overlying the touch electrodes TE. Alternatively, the color filters CF and the black matrix BM may be disposed on an overcoat layer OC provided on the touch electrodes TE. The black matrix BM may correspond with non-emissive regions of the sub pixels, and may be aligned with the touch electrodes TE, as shown.

As an alternative example, as illustrated in FIG. 3, the color filters CF and the black matrix BM may be disposed below the touch electrodes TE. Here, an overcoat layer OC may be interposed between the touch electrodes TE and both the color filters CF and the black matrix BM. The color filter CF and the black matrix BM may be provided on the encapsulation layer Encap, as shown in FIG. 3, while the touch electrodes TE may be provided on the overcoat layer OC.

That is, the touch electrodes TE and the color filters CF may be designed to have a suitable position relationship, taking touch and display performances into account.

Further, the configuration in which the touch electrodes TE are disposed on the encapsulation layer Encap can overcome a conventional problem in that due to organic substance in a OLED device, it is difficult to form the touch electrodes TE, which are generally composed of a metallic material. However, in embodiments of display panels provided herein, the problem can be overcome by providing the touch electrodes TE on the encapsulation layer Encap, so that an OLED device having excellent display and touch performances can be accomplished.

Referring again to FIG. 1, the touch electrodes TE disposed in the touch display panel 110 are provided on the active area in a pattern of being regularly separated from one another, and are connected to the driving circuit 120 via the touch lines TL. The touch electrodes TE may be spaced apart from one another by a uniform spacing or gap between adjacent touch electrodes TE.

The touch electrodes TE and the touch lines TL may be arranged in a variety of structures depending on a touch-sensing manner or a touch sensing method to be utilized in the particular touch display device. Although a sensing manner using mutual capacitance will be exemplarily described herein, the present disclosure is not limited thereto.

The touch electrodes TE may include a plurality of Tx electrodes TE(Tx) that receive a touch driving signal from the driving circuit 120, and a plurality of Rx electrodes TE(Rx) that transmit a touch sensing signal to the driving circuit 120.

The touch lines TL may include a plurality of first touch lines TL(Tx) that are connected to the Tx electrodes TE(Tx) of the touch electrodes TE and a plurality of second touch lines TL(Rx) that are connected to the Rx electrodes TE(Rx).

For example, as illustrated in FIG. 1, the first touch lines TL(Tx) may be parallel-connected to the Tx electrodes TE(Tx) of the touch electrodes TE, and the second touch lines TLs (Rx) may be serial-connected to the Rx electrodes TE(Rx) of the touch electrodes TE.

The driving circuit 120 transmits a touch driving signal to the Tx electrodes TE(Tx) via the first touch lines TL(Tx) and receives a touch sensing signal from the Rx electrodes TE(Rx) via the second touch lines TL(Rx) during a touch sensing period of time so as to determine a user's touch state and positions of a user's touch on the touch display panel 110.

Thus, in one or more embodiments, the touch display device 100 includes the touch electrodes TE and the touch lines TL arranged on the display panel so that the user's touch on the display panel can be recognized.

The touch display panel 110 of the touch display device 100 may have a variety of shapes, and may be bendable. For example, the touch display panel 110 may have a bending area (hereinafter, referred to as a bend area) at a periphery thereof.

Figure 4:
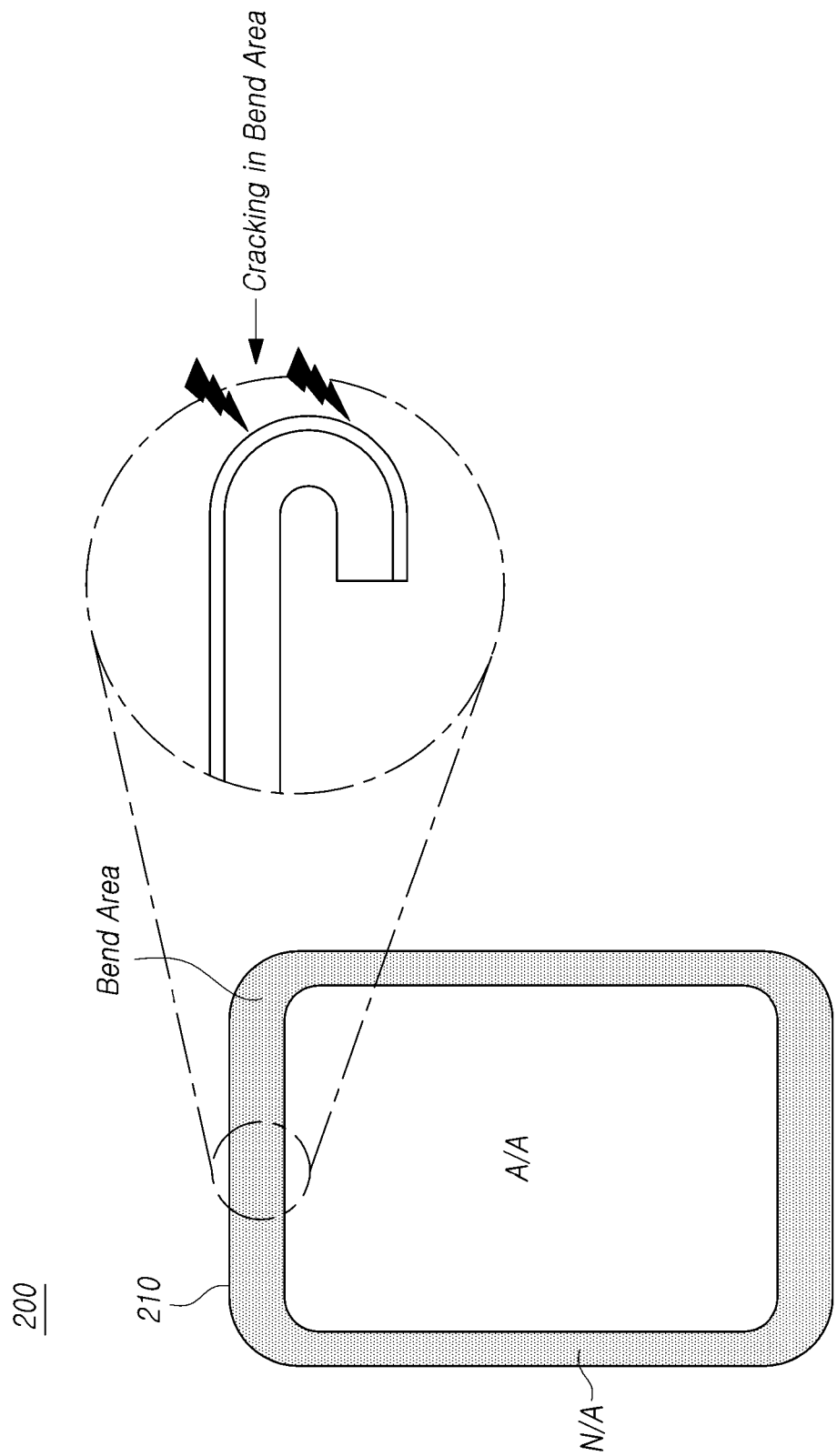
FIG. 4 is a schematic diagram illustrating a peripheral bend area of a touch display device according to one or more embodiments.

FIG. 4 illustrates an exemplary touch display device 200 in which the touch display panel has the peripheral bend area.

Referring to FIG. 4, the touch display panel 210 of the touch display device 200 may have an active area A/A in which sub pixels, the touch electrodes TE, and the like are arranged, and a non-active area N/A that is outside of the active area A/A. The touch display device 200 and the touch display panel 210 may thus include many of the same features as shown in, and described with respect to, the touch display device 100 and touch display panel 110 of FIG. 1. A difference is that the touch display device 200 of FIG. 4 includes a bend area.

The non-active area N/A at the periphery of the touch display panel 210 may have a bend area that is at least partially bent or bendable. That is, the bend area may be an area that is folded or bent, for example, during a manufacturing process and that remains bent during use by a user. Additionally or alternatively, the bend area may be a bendable area that may be repeatedly bent and unbent by a user during use of the touch display device 200.

The non-active area N/A may surround the periphery of the active area A/A, as shown in FIG. 4; however, embodiments of the present disclosure are not limited thereto. For example, in one or more embodiments, the non-active area N/A may be positioned adjacent to one or more sides of the active area A/A. Moreover, the bend area is shown and described with respect to FIG. 4 as corresponding to the entire non-active area N/A. However, in one or more embodiments, the bend area may be an area corresponding to only part of the non-active area N/A. For example, the non-active area N/A may surround the periphery of the active area A/A, while the bend area may be positioned along one or more sides of the non-active area N/A, e.g., upper and lower sides, or left and ride sides.

In the bend area, the touch lines TL may be arranged to connect the touch electrodes TE in the active area A/A and the driving circuit 120.

The touch lines TL may be formed of a metal material, and a dielectric layer formed of a dielectric material may be disposed on the touch lines TL.

The touch lines TL connect the touch electrodes TE and the driving circuit 120 to one another and are arranged in the bend area, along the bent shape of the bend area.

That is, the touch lines TL may extend along the bent portion of the touch display panel 210 in the bend area. Accordingly, the touch lines TL have bent portions that correspond to the shape of the bend of the bend area.

Since the touch lines TL arranged in the bend area are bent along the shape of the bend in the bend area, the touch lines TL and the dielectric layer disposed thereon may have cracking, through which defective moisture permeation may occur. That is, the bend in the touch lines TL and the dielectric layer disposed thereon may cause the touch lines TL and the dielectric layer to crack in the bent regions.

The touch display device according to one or more embodiments of the present disclosure provides a structure that is able to prevent the touch lines TL and the dielectric layer thereon from being cracked in the bend area, and that prevents the defective moisture permeation due to cracking.

Figure 5:
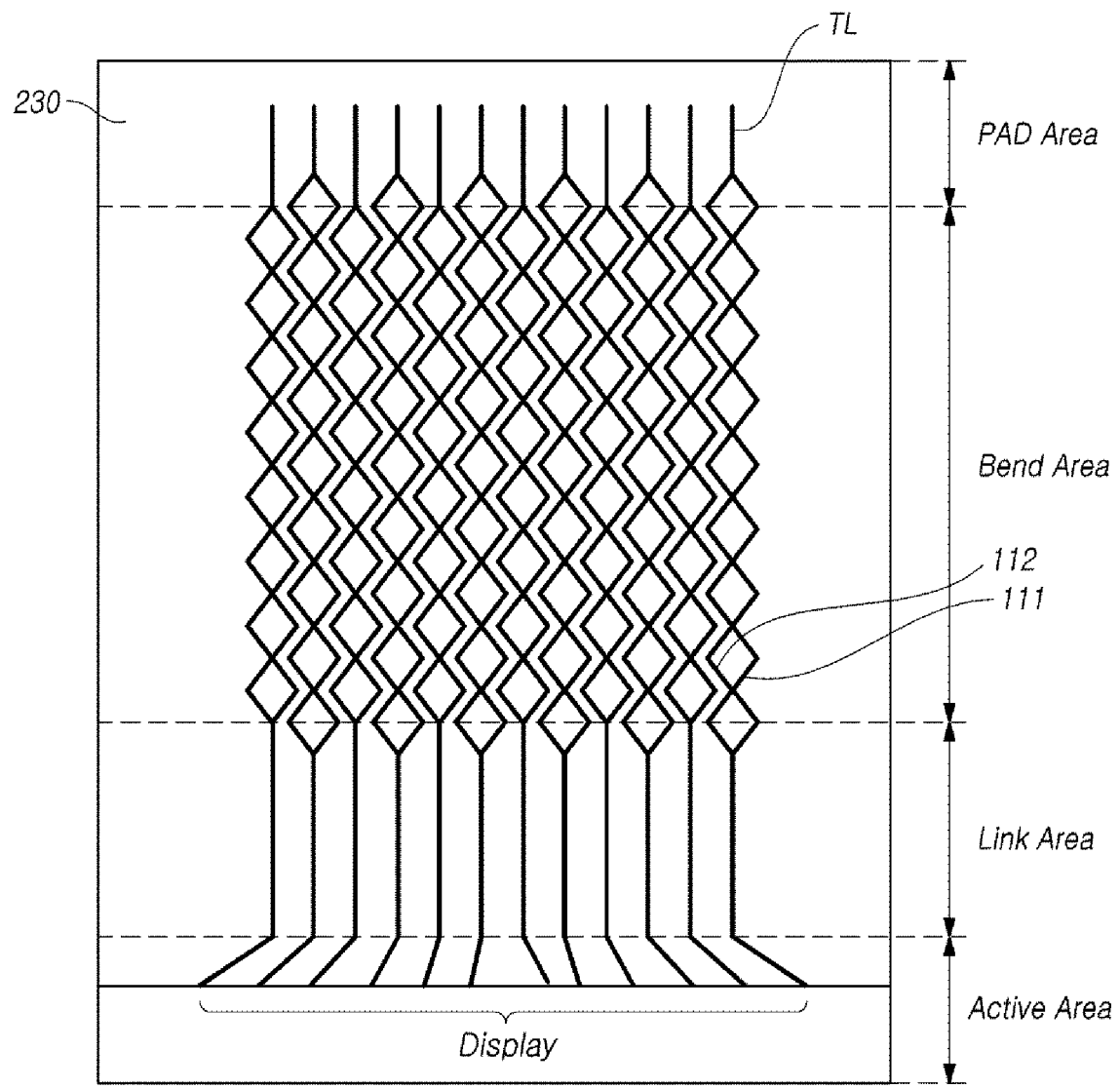
FIGS. 5 and 6 are schematic diagrams illustrating examples of structures of touch lines disposed in a peripheral bend area of a touch display device according to one or more embodiments of the present disclosure.
Figure 6:
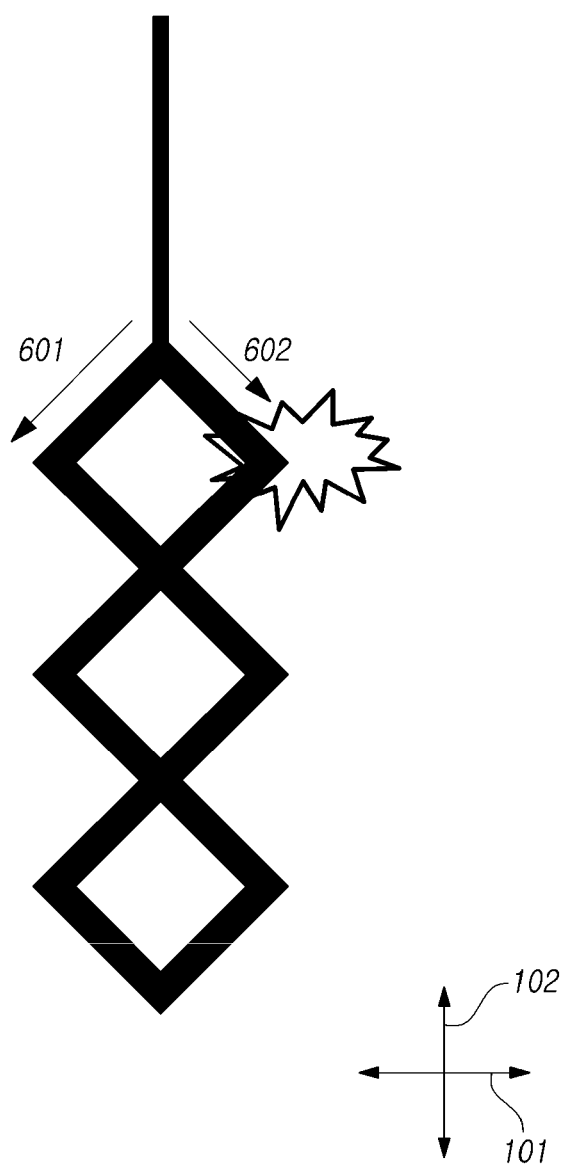

FIGS. 5 and 6 illustrate structures of the touch lines TL in the bend area of a touch display panel in a touch display device according to one or more embodiments of the present disclosure.

FIG. 5 is a sectional view illustrating the bend area of the display panel in an unfolded or unbent state.

Referring to FIG. 5, a link area in which the touch lines TL for connection to the touch electrodes TE is positioned outside of the active area A/A of the touch display panel in which the touch electrodes TE are arranged. The touch display panel may include the features shown in, and described with respect to, the touch display panel 110 of FIG. 1, including the touch electrodes TE, touch lines TL and the like, each of which may be formed on a flexible substrate 230. The flexible substrate 230 may be provided in both the active area A/A and the non-active area N/A of the touch display panel. Accordingly, in the bend area, the flexible substrate 230, as well as the touch lines TL, may be bendable. The link area may be positioned in the non-active area N/A, and may connect the active area A/A to the bend area, as shown in FIG. 5.

The bend area is positioned at the periphery of the touch display panel and in proximity or adjacent to the link area.

A pad area in which the touch lines TL connected to the driving circuit 120 are arranged is positioned in proximity or adjacent to the bend area.

That is, the touch lines TL are arranged in the link area, the bend area, and the pad area, which are outside of the active area A/A, to connect the touch electrodes TE arranged in the active area A/A and the driving circuit 120.

Here, due to the bend of the bend area, the touch lines TL arranged in the bend area may be cracked. However, the touch display device according to one or more embodiments provides a structure that is able to reduce or eliminate the generation of cracks in the touch lines TL even in the case in which the touch lines TL are arranged in the bend area.

For example, as illustrated in FIG. 5, the touch lines TL may be arranged in the link area and the pad area in a linear form, i.e., as a straight line that extends through the link area and the pad area. Further, the touch lines TL may be arranged in the bend area to have angled portions that extend at an angle with respect to the direction in which the touch display panel is bent or bendable in the bend area. That is, the touch display panel may be bent or bendable in the bend area about a bend axis that extends in a first direction 101, such that sides of the bend area that are opposite to one another in a second direction 102 may be brought toward each other when the touch display panel is bent in the bending area. For example, the upper and lower sides of the bending area, as shown in FIG. 5, which are opposite to one another in the second direction 102. The bend axis extends in the first direction 101, which may be a horizontal direction as shown in FIG. 5. Thus, when the touch display panel is bent in the bending area along the bend axis, the upper and lower sides of the bending area are rotated toward one another. It will be readily appreciated that while the bend area is described herein as having a bend axis that extends in the first direction 101, embodiments provided herein are not limited thereto. For example, the touch display panel may be bent or bendable about multiple axes in the bend area, which may extend in any direction.

Each of the touch lines TL may include a first portion 111 and a second portion 112 in the bend area. That is, the touch lines TL may be formed as two separate portions in the bend area, with both the first portion 111 and the second portion 112 connected to a same touch line TL in the link area and in the PAD area, as shown. The first portion 111 and the second portion 112 may be formed as zigzag lines in the bend area, and the first portion and the second portion may repeatedly intersect one another in the bend area. The zigzag lines of each of the first portion 111 and the second portion 112 extend across the bend area at angles between the first direction 101 and the second direction 102. Each of the touch lines TL thus form a pattern of repeating shapes in the bend area, due to the intersections of the first portion 111 and the second portion 112.

Accordingly, the touch lines TL do not extend in a straight line in the second direction 102 across the bend area. Instead, the touch lines TL include first and second portions 111, 112, which form a pattern in the bend area such that the touch lines TL extend across the bend area at angles between the first direction 101 and the second direction 102.

Specifically, in the bend area, the touch lines TL may have a diamond-shaped arrangement in which the first and second portions 111, 112 of the touch lines TL extend successively in an angle between the first direction 101 and the second direction 102 in the bend area, thereby forming an arrangement of a plurality of diamonds being connected.

Such an arrangement of the touch lines TL in a pattern of multiple diamonds allows the bending force on the touch lines TL to be dispersed at an angle to the bend direction of the bend area even in the case in which the touch lines TL are bent along the bent shape of the bend area. That is, when the touch display panel is bent in the bending area about the bend axis in the first direction 101, the bending force on the touch lines TL is dispersed at an angle between the first direction 101 and the second direction 102.

Specifically describing this with reference to FIG. 6, when the touch lines TL are bent along the bent shape of the bend area, the bending force applied to the touch lines TL is dispersed at an angle to the direction in which the bend area is bent. That is, the bending force is dispersed at an angle between the first direction 101 and the second direction 102.

For example, as illustrated in FIG. 6, when the touch lines TL are arranged in a bent shape along the bend area, the touch lines TL are applied with the force that is dispersed in two directions 601 and 602.

That is, when the touch lines TL are bent along the bent shape of the bend area, the force applied to the touch lines TL is dispersed in the first direction 101 and the second direction 102 (e.g., X- and Y-directions) by means of the zigzag or diamond-type arrangement of the touch lines TL, thereby preventing cracking that may occur due to the bent shape of the touch lines TL.

Accordingly, cracking of the touch lines TL in the bend area of the touch display panel and resulting defective moisture permeation from the cracking may be prevented.

Further, the touch display devices according to the embodiments of the present disclosure provides a structure that can disperse force applied to the dielectric layer on the touch lines TL in the bend area by providing a compensation pattern to the dielectric layer.

Figure 7:
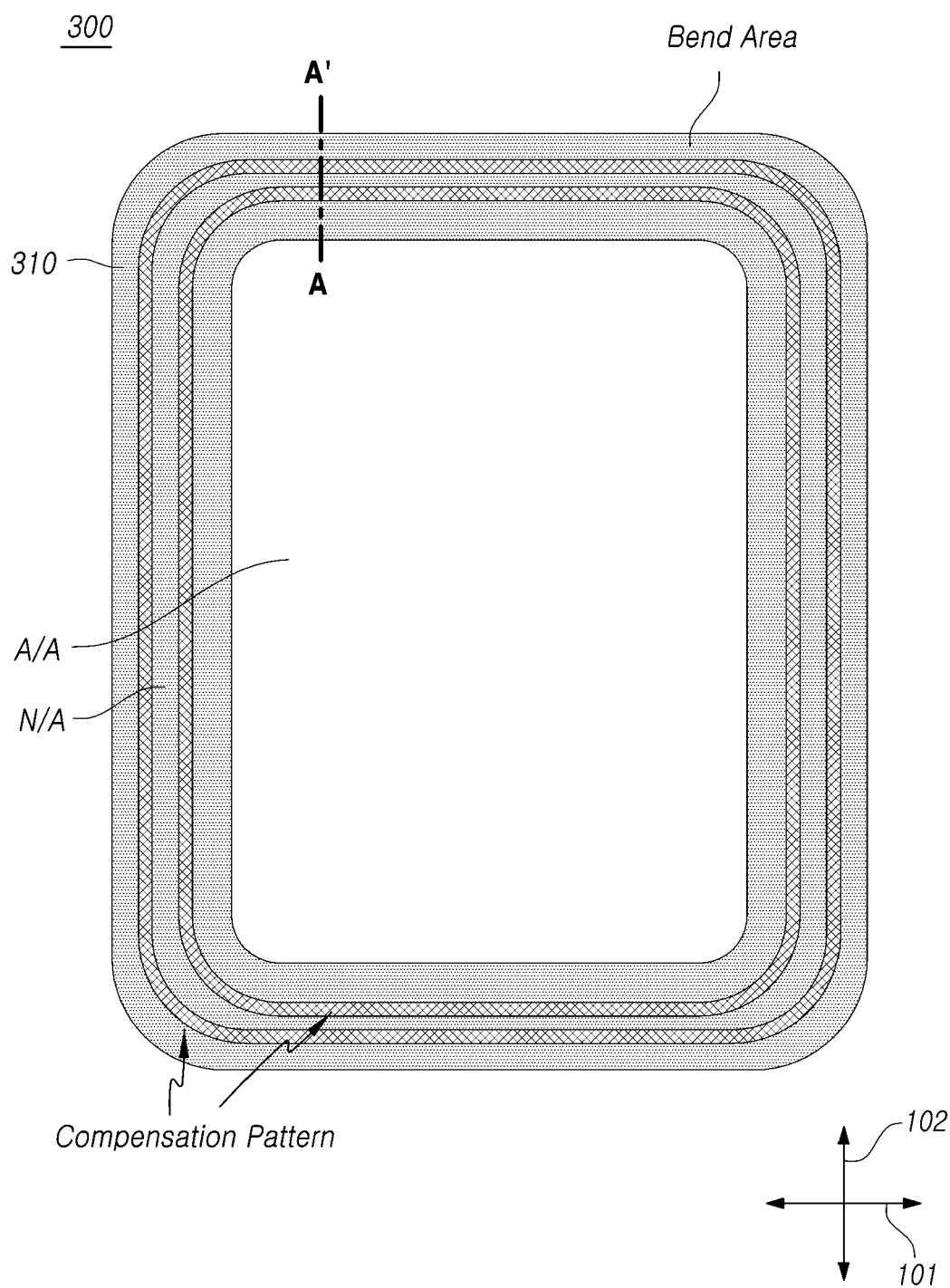
FIG. 7 is a plan view illustrating an example structure of a compensation pattern formed in the bend area of a touch display device according to one or more embodiments of the present disclosure.

FIG. 7 illustrates a structure of a touch display device 300 in which a compensation pattern is provided to the dielectric layer disposed in the bend area of the touch display panel 310.

Referring to FIG. 7, the touch display panel 310 of the touch display device 300 includes an active area A/A in which sub pixels, touch electrodes TE and the like are arranged, and a non-active area N/A that is positioned outside of the active area A/A.

The non-active area N/A may include a bend area in at least a portion of a periphery of the touch display panel 310.

In the bend area, the touch lines TL connecting the touch electrodes TE arranged in the active area A/A and the driving circuit 120 may be arranged.

Specifically, the touch lines TL may be provided and a dielectric layer may be provided on the touch lines TL.

Further, the touch lines TL may include a double-structure including first and second metal layers, with a first dielectric layer arranged on the first metal layer of the touch lines TL, and the second metal layer arranged on the first dielectric layer. Here, the second metal layer may be positioned to correspond to the first metal layer, such that the first metal layer and the second metal layer are aligned with one another. Then, the second dielectric layer may be arranged on the second metal layer.

As described above, the touch lines TL arranged in the bend area may be arranged at an angle to the bend direction of the bend area so as to compensate for an external force applied in the bend area. That is, the touch lines TL may include first and second portions 111, 112, which form a pattern in the bend area such that the touch lines TL extend across the bend area at angles between the first direction 101 and the second direction 102.

Further, a compensation pattern may be provided on the first dielectric layer disposed on the touch lines TL and then the second dielectric layer may be arranged on the compensation pattern of the first dielectric layer so that the force to be applied to the dielectric layer disposed in the bend area may be dispersed.

Specifically, the compensation pattern may include one or more openings 801 (FIG. 8) formed in the first dielectric layer disposed on the touch lines TL, and the openings 801 may extend in a direction parallel to the bend axis of the bend area. That is, the openings 801 may extend along the first direction 101 along the upper and lower sides of the touch display panel 310, and may extend along the second direction 102 along the left and right sides of the touch display panel 310, as shown in FIG. 7. The bend area in the upper and lower sides of the touch display panel 310 may be bent or bendable about respective bend axes that extend in the first direction 101, and the bend area in the left and right sides of the touch display panel 310 may be bent or bendable about respective bend axes that extend in the second direction 102.

The compensation pattern is a pattern that includes one or more openings 801 in a portion of the first dielectric layer. The compensation pattern may be a groove pattern or a hole pattern. That is, the compensation pattern may include one or more grooves that continuously extend along the compensation pattern.

The second dielectric layer disposed on the first dielectric layer is arranged on the compensation pattern, i.e., in the opening 801, in the first dielectric layer.

Thus, the compensation pattern is configured such that the second dielectric layer protrudes into the opening 801 formed in the first dielectric layer.

In the bend area, such a structure of the second dielectric layer protruded into the first dielectric layer enables the force applied to the second dielectric layer to be dispersed in the depth direction of the first dielectric layer.

The compensation pattern provided on the first dielectric layer in the bend area of the touch display panel 310 may be formed along the periphery of the touch display panel 310 as illustrated in FIG. 7.

The compensation pattern formed on the first dielectric layer may be one compensation pattern, or two or more compensation patterns as illustrated in FIG. 7.

In the case of two or more compensation patterns, the compensation patterns may be arranged parallel with each other.

In a case in which a portion of the periphery of the touch display panel 310 is rounded, the compensation pattern formed on the first dielectric layer in the bend area may also be rounded along the bent shape of the bend area of the touch display panel 310. As used herein, the term "rounded" may include any curved shape, including non-circular curves.

The structure of the compensation patterns formed on the first dielectric layer in the bend area of the touch display panel 310 will be described in detail with reference to the cross-sectional structure taken along line A-A' in FIG. 7.

Figure 8:
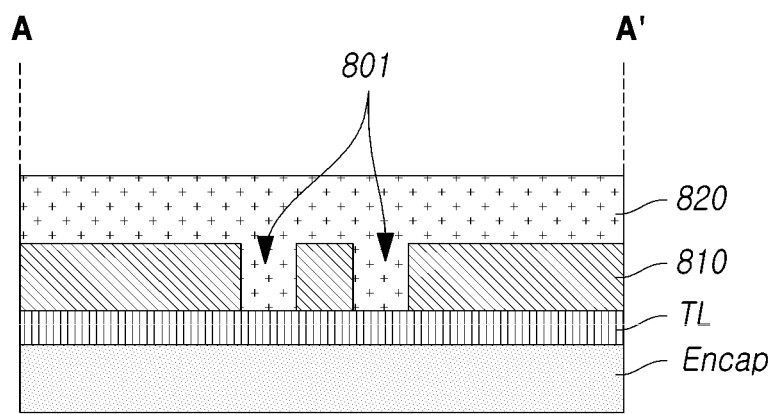
FIG. 8 is a cross-sectional view illustrating an example structure taken along line A-A' in the bend area of the touch display device illustrated in FIG. 7.

FIG. 8 is a cross-sectional view taken along line A-A' in FIG. 7, which illustrates an example cross-sectional structure of the dielectric layer on the touch lines TL arranged in the bend area of the display panel 310 in the touch display device 300.

Referring to FIG. 8, touch lines TL are arranged on an encapsulation layer Encap, and a first dielectric layer 810 is arranged on the touch lines TL. Then, a second dielectric layer 820 is arranged on the first dielectric layer 810. Further, a metal layer (not shown), which may form a part of the touch lines TL, may be further arranged between the first dielectric layer 810 and the second dielectric layer 820.

Openings 801 are formed in the first dielectric layer 810, and the openings 801 may define the compensation pattern, which extends in a direction parallel to a bend axis of the bend area.

One or more compensation patterns may be formed in the direction parallel to the bend axis of the bend area. The compensation patterns may be groove patterns or hole patterns.

Such groove patterns or hole patterns may be formed at a process of forming the touch lines TL and the first dielectric layer 810 on the touch display panel 110.

For example, a metal layer for forming touch lines TL may be deposited and etched on an encapsulation layer Encap, and then the first dielectric layer 810 may be deposited on the touch lines TL.

After the first dielectric layer 810 is deposited, the groove patterns or hole patterns are formed in the first dielectric layer 810 and extend in a direction parallel to the bend axis of the bend area so as to form open compensation patterns according to the groove or hole patterns formed in the first dielectric layer 810. The groove or hole patterns include openings 801 formed in the first dielectric layer.

After the compensation patterns are formed, the second dielectric layer 820 may be deposited on the first dielectric layer 810.

Here, before the second dielectric layer 820 is formed, a metal layer that forms a part of the touch lines TL may be deposited and etched on the first dielectric layer 810.

As the second dielectric layer 820 is deposited on the first dielectric layer 810 having the compensation patterns, i.e., the openings 801, the second dielectric layer 820 is positioned in the compensation patterns of the first dielectric layer 810. That is, the second dielectric layer 820 is deposited in the openings 801.

Since the second dielectric layer 820, which is positioned on the outer side of the touch display panel 810, is provided in the compensation patterns of the first dielectric layer 810, the structure is such that the second dielectric layer 820 protrudes in a depth direction thereof.

Thus, the structure of the second dielectric layer 820 protruded in the depth direction enables the force applied to the dielectric layer in the bend area to be dispersed in the depth direction.

The dispersion of the force applied to the dielectric layers reduces cracking of the dielectric layers in the bend area of the touch display panel 310 and prevents or reduces defective moisture permeation due to the cracking.

Figure 9:
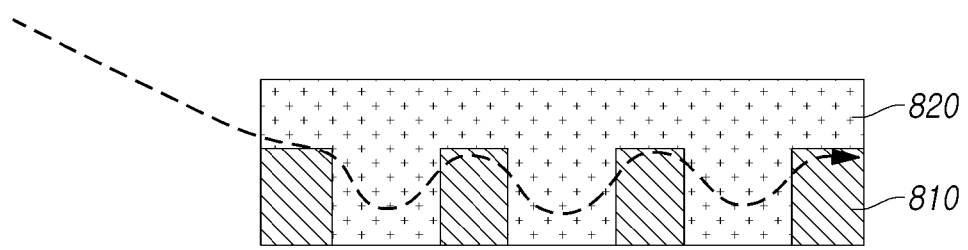
FIG. 9 is a cross-sectional view illustrating an example structure that is similar to the view shown in FIG. 8, but includes a second dielectric layer formed in three openings, to illustrate a principle of dispersion of force.

The principle of dispersion of force applied to the dielectric layers due to the compensation patterns of the first dielectric layer 810 and the structure of the second dielectric layer 820 will be described in detail with reference to FIG. 9. FIG. 9 is a cross-sectional view illustrating an example structure that is similar to the view shown in FIG. 8, but includes a second dielectric layer formed in three openings, to illustrate a principle of dispersion of force.

As illustrated in FIG. 9, the second dielectric layer 820 is configured such that the second dielectric layer 820 protrudes into the first dielectric layer 810 in a depth direction thereof in positions of the compensation patterns, i.e., in the openings, in the first dielectric layer 810.

When the second dielectric layer 820 having the above configuration is bent along the bent shape of the bend area, the force applied to the second dielectric layer 820 is dispersed in the depth direction of the first dielectric layer 810 due to the structure of the second dielectric layer 820 protruded into the first dielectric layer 810 in the depth direction thereof.

That is, as described previously herein, the bending force being applied to the touch lines TL arranged in the bend area is dispersed at an angle between the first direction 101 and the second direction 102, due to the patterns formed in the touch lines TL in the bend area. Further, the bending force being applied to the dielectric layer is dispersed in a depth direction, e.g., the Z-direction which may be perpendicular to the first and second directions 101, 102, due to the compensation pattern formed in the first and second dielectric layers 810, 820. Thus, the force being applied to the dielectric layer in the bend area may be dispersed so that the dielectric layer in the bend area can be prevented from being cracked.

Further, the present disclosure makes a moisture permeation path longer if cracking is generated at the dielectric layer, as there are two separate dielectric layers disposed over the touch lines TL, thereby minimizing defective moisture permeation due to the generation of cracking.

While the compensation patterns formed on the dielectric layer in the bend area have been illustrated as being formed according to the peripheral shape of the touch display panel 310, the compensation patterns may have a variety of other structures and shapes that can disperse force applied to the dielectric layer.

Figure 10:
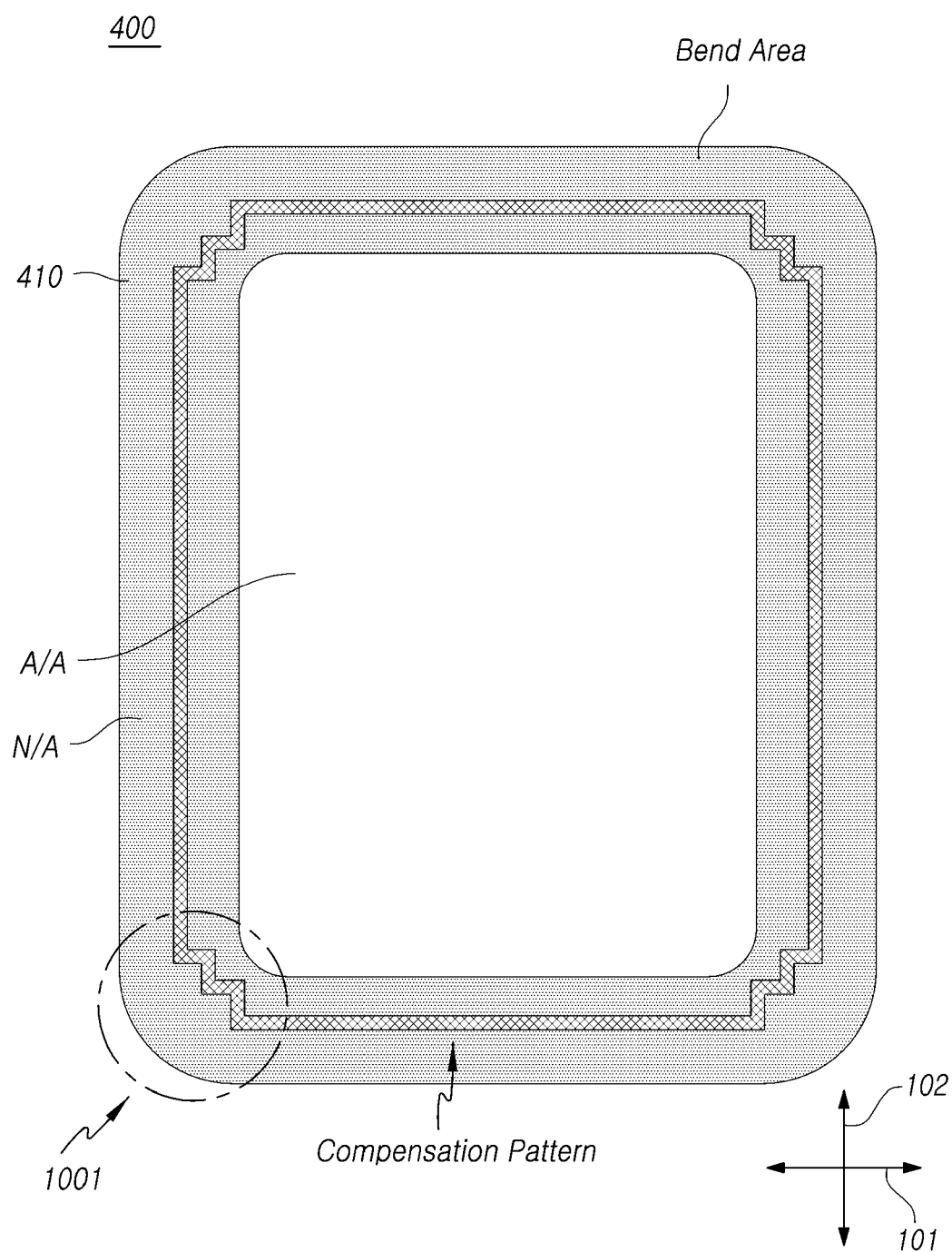
FIG. 10 is a plan view illustrating another example structure of a compensation pattern formed in the bend area of a touch display device according to one or more embodiments of the present disclosure.

FIG. 10 is a plan view illustrating another structure of a compensation pattern formed on a dielectric layer in a bend area of a touch display panel 410 of a touch display device 400 according to one or more embodiments of the present disclosure.

Referring to FIG. 10, the dielectric layer formed in the peripheral bend area of the touch display panel 410 has an open compensation pattern.

Here, at least a portion of the periphery of the touch display panel 410 may be rounded. That is, the periphery of the touch display panel 410 may include rounded regions 1001, which may correspond to corner regions of the touch display panel 410.

The compensation pattern may have a stepped pattern in the rounded regions 1001, and the stepped pattern may include horizontal linear portions and vertical linear portions that are continuously connected. That is, the compensation pattern in the rounded regions 1001 may have one or more straight portions that extend in the first direction 101 that are connected to one or more straight portions that extend in the second direction 102.

That is, the compensation pattern formed on the dielectric layer in the bend area of the touch display panel 410 is formed in a direction intersecting the direction in which the bend area is rounded so as to disperse force applied to the dielectric layer during bending. Thus, if the compensation pattern is formed in a direction intersecting the bend direction of the bend area, it can be modified into other different forms.

Figure 11:
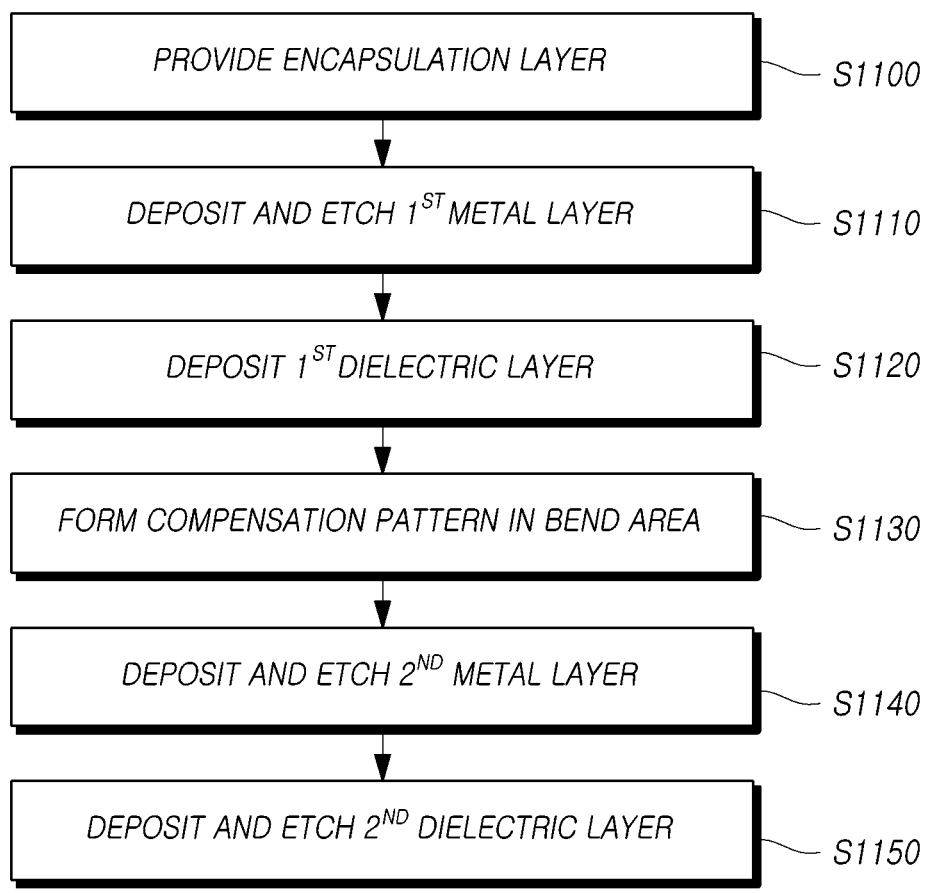
FIG. 11 is a flowchart illustrating a method of fabricating a touch display panel according to one or more embodiments of the present disclosure.

FIG. 11 is a flowchart illustrating a method of fabricating a touch display panel according to one or more embodiments of the present disclosure.

Referring to FIG. 11, at S1100, an encapsulation layer is formed or otherwise provided. At S1110, a first metal layer for formation of the touch lines TL is deposited on the encapsulation layer Encap and etched.

At S1120, a first dielectric layer is deposited on the first metal layer, and at S1130, a compensation pattern is patterned on the first dielectric layer in a bend area.

The compensation pattern is arranged to extend in a direction parallel to a bend axis of the bend area. The compensation pattern may be a groove or hole pattern that is open in portions of the first dielectric layer.

At S1140, a second metal layer that forms a part of the touch lines TL is deposited on the first dielectric layer and etched, and then, at S1150, a second dielectric layer is deposited on the second metal layer and etched.

Since the second dielectric layer is provided on the first dielectric layer having an open compensation pattern, the second dielectric layer is positioned in the open compensation pattern in the first dielectric layer. Thus, the structure is such that the second dielectric layer protrudes into the first dielectric layer in the depth direction thereof, and the structure enables the bending force applied to the dielectric layer during bending to be dispersed.

The example embodiments provides the structure that is able to disperse the force applied to the dielectric layer and the touch lines TL during bending through the structure of the touch lines TL in the bend area and through the compensation pattern formed in the dielectric layer in the touch display panel.

Thus, even in the case in which portion of the periphery of the touch display panel has a bend area, cracking generated in the bend area and the defective moisture permeation due to the generation of cracking can be minimized.

The features, structures, and effects described in the present disclosure are included in at least one embodiment but are not necessarily limited to a particular embodiment. A person skilled in the art can apply the features, structures, and effects illustrated in the particular embodiments to one or more additional embodiments by combining or modifying such features, structures, and effects. It should be understood that all such combinations and modifications are included within the scope of the present disclosure.

Although the exemplary embodiments have been described for illustrative purposes, a person skilled in the art will appreciate that various modifications and applications are possible without departing from the essential characteristics of the present disclosure. For example, the specific components of the exemplary embodiments may be variously modified.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
    a flexible substrate having a bend area adjacent to at least a portion of a periphery of the flexibly: substrate;
    a plurality of touch electrodes on the flexible substrate;

a plurality of touch lines disposed on the flexible substrate and extending into the bend area;

a first dielectric layer disposed on and in contact with the plurality of touch lines, the first dielectric layer including an opening that exposes portions of the plurality of touch lines and forms at least a part of a compensation pattern in the bend area; and a second dielectric layer disposed on the first dielectric layer and in contact with the plurality of touch lines through the opening in the compensation pattern of the first dielectric layer, wherein the second dielectric layer protrudes into the opening in a depth direction to be deposited in the opening, and a thickness of the second dielectric layer in the opening is greater than a depth of the opening.

2. The touch display device according to claim 1 wherein the compensation pattern extends in a direction parallel to a bend axis of the bend area.

3. The touch display device according to claim 1 wherein the compensation pattern is a groove pattern, the groove pattern having a continuous groove formed in the first dielectric layer that extends along the compensation pattern.

4. The touch display device according to claim 1 wherein the first dielectric layer includes two or more compensation patterns in the bend area, wherein the two or more compensation patterns are disposed in parallel with each other.

5. The touch display device according to claim 1 wherein a portion of the periphery of the flexible substrate is rounded, and the compensation pattern of the first dielectric layer is rounded to correspond to the rounded portion of the periphery of the flexible substrate.

6. The touch display device according to claim 1 wherein a portion of the periphery of the flexible substrate is rounded, and a portion of the compensation pattern of the first dielectric layer, disposed adjacent to the rounded portion of the periphery of the flexible substrate, has a stepped shape including a first portion that extends in a first direction and a second portion that extends in a second direction that intersects the first direction, the first portion being connected to the second portion.

7. The touch display device according to claim 1 wherein the flexible substrate is bendable about a bend axis that extends in a first direction in the bend area, the plurality of touch lines extend in the bend area at angles between the first direction and a second direction that is transverse to the first direction.

8. The touch display device according to claim 7 wherein each of the plurality of touch lines includes a first portion and a second portion in the bend area, each of the first and second portions having a zigzag shape that intersect one another in the bend area.

9. The touch display device according to claim 8 wherein the intersecting zigzag shape of the first portion and the second portion form a plurality of diamond shapes in the bend area.

10. The touch display device according to claim 1 wherein the bend area surrounds a periphery of an active area of the touch display device.

11. The touch display device according to claim 1 wherein at least part of the second dielectric layer is in contact with the first dielectric layer in the opening of the first dielectric layer.

12. A panel, comprising:
an encapsulation layer;
a plurality of touch lines on the encapsulation layer;
a first dielectric layer on and in contact with the plurality of touch lines, the first dielectric layer including a compensation pattern having an opening in a bend area positioned adjacent to a periphery of the panel, the opening exposes portions of the plurality of touch lines; and a second dielectric layer on the first dielectric layer, the second dielectric layer protrudes into the opening included in the first dielectric layer such that the second dielectric layer contacts with the plurality of touch lines, wherein the second dielectric layer protrudes into the opening in a depth direction to be deposited in the opening, and a thickness of the second dielectric layer in the opening, is greater than a depth of the opening.

13. The panel according to claim 12 wherein the compensation pattern extends in a direction parallel to a bend axis of the bend area, and the compensation pattern includes at least one of a hole pattern or a groove pattern.

14. The panel according to claim 12 wherein the first dielectric layer includes two or more compensation patterns in the bend area, wherein the two or more compensation patterns are disposed in parallel with each other.

15. The panel according to claim 12 wherein the compensation pattern of the first dielectric layer is rounded to correspond to a rounded portion of a periphery of the first dielectric layer.

16. The panel according to claim 12 wherein a portion of the compensation pattern of the first dielectric layer, disposed adjacent to a rounded portion of the periphery of the panel, has a stepped shape including a first portion that extends in a first direction and a second portion that extends in a second direction that intersects the first direction, the first portion being connected to the second portion.

17. The panel according to claim 12 wherein the second dielectric layer is disposed in the opening in the compensation pattern of the first dielectric layer.

18. The panel according to claim 12 wherein the compensation pattern surrounds a periphery of an active area of the panel.

19. A device, comprising:
a flexible substrate having an active area, a bend area, and a link area between the active area and the bend area;
a touch layer on the flexible substrate, the touch layer including a plurality of touch electrodes, each of the plurality of touch electrodes including:
a first portion in the link area,
a second portion in the bend area, and
a third portion in the bend area, the second portion and the third portion being connected to the first portion, at least one of the plurality of touch electrodes including the second and third portions in the link area;
a first dielectric layer on and in contact with the touch layer in the bend area, the first dielectric layer including an opening;
a compensation pattern in the bend area, the compensation pattern including a groove in the first dielectric layer that exposes at least a portion of the touch layer in the bend area; and
a second dielectric layer on the first dielectric layer and protruding into the groove such that the second dielectric layer contacts with the plurality of touch lines,
wherein the second dielectric layer protrudes into the opening in a depth direction to be deposited in the opening, and a thickness of the second dielectric layer in the opening is greater than a depth of the opening.

20. The device of claim 19 wherein the flexible substrate further includes a pad area adjacent to the bend area, the bend area being between the link area and the pad area, at least one of the plurality of touch electrodes including the second and third portions in the pad area.

\* \* \* \* \*

UNITED STATES PATENT AND TRADEMARK OFFICE
CERTIFICATE OF CORRECTION

PATENT NO. : 10,649,565 B2
APPLICATION NO. : 15/807288
DATED : May 12, 2020
INVENTOR(S) : Yangsik Lee et al.

Page 1 of 1

It is certified that error appears in the above-identified patent and that said Letters Patent is hereby corrected as shown below:

In the Claims

Column 12, Claim 1, Line 66:
"a portion of a periphery of the flexibly: substrate;" should read, --a portion of a periphery of the flexible substrate;--.

Column 14, Claim 12, Line 13:
"in the opening, is greater than a depth of the opening." should read, --in the opening is greater than a depth of the opening.--.

Signed and Sealed this
Tenth Day of November, 2020

Andrei Iancu
*Director of the United States Patent and Trademark Office*